(12) United States Patent
Koupsin et al.

(10) Patent No.: US 10,063,893 B2
(45) Date of Patent: Aug. 28, 2018

(54) CONTROLLING THE TRANSMISSION OF A VIDEO DATA STREAM OVER A NETWORK TO A NETWORK USER DEVICE

(71) Applicant: SINGLE-MEMBER LIMITED LIABILITY COMPANY MOBIVITA, Sofia (BG)

(72) Inventors: Evgenij V. Koupsin, St. Petersburg (RU); Evgenij A. Kruk, St. Petersburg (RU); Mikhail B. Sergeev, St. Petersburg (RU)

(73) Assignee: The legal entity Single-Member LLC MOBIVITA (EOOD MOBIVITA), Sofia (BG)

( * ) Notice: Subject to any disclaimer, the term of this patent is extended or adjusted under 35 U.S.C. 154(b) by 39 days.

(21) Appl. No.: 15/034,787

(22) PCT Filed: Nov. 7, 2014

(86) PCT No.: PCT/RU2014/000845
§ 371 (c)(1),
(2) Date: Sep. 1, 2016

(87) PCT Pub. No.: WO2015/076705
PCT Pub. Date: May 28, 2015

(65) Prior Publication Data
US 2017/0048558 A1 Feb. 16, 2017

(30) Foreign Application Priority Data
Nov. 8, 2013 (RU) ................................ 2013149951

(51) Int. Cl.
H04N 21/222 (2011.01)
H04N 19/40 (2014.01)
(Continued)

(52) U.S. Cl.
CPC ....... *H04N 21/222* (2013.01); *H04L 67/2842* (2013.01); *H04N 19/115* (2014.11);
(Continued)

(58) Field of Classification Search
CPC ............... H04N 21/222; H04N 21/231; H04N 21/23106; H04N 21/234309;
(Continued)

(56) References Cited

U.S. PATENT DOCUMENTS 6,792,463 B1 * 9/2004 Lamberton ............. H04L 29/06
709/203
2009/0000664 A1 1/2009 Lee

FOREIGN PATENT DOCUMENTS

EP 1872536 B1 9/2008
EP 2566172 A1 3/2013
(Continued)

OTHER PUBLICATIONS

International Search Report from PCT/RU2014/000845, filed Nov. 7, 2014, dated Mar. 12, 2015.
Tanenbaum, E, Computer Networks, 2003, p. 489, 4th Edition.

*Primary Examiner* — Nicholas T Corbo
(74) *Attorney, Agent, or Firm* — Patentbar International, P.C.

(57) ABSTRACT

A device and method for controlling the transmission of a video data stream over a network to a network user device involve storing video data segments in a data storage entity, receiving a query from at least one network user device, determining current parameters of the network user device, changing the video data segments stored in the data storage entity, and transmitting the changed video data segments to the network user device in response to the query. The video data segments stored in the data storage entity are changed by changing the bit rate of the video data segments by transcoding each video data segment in real-time. It
(Continued)

becomes possible to control the transmission of a video data stream over a network to a user device, as well as enhancing speed, simplicity and cost effectiveness, with minimal losses of quality and maximum user satisfaction.

21 Claims, 7 Drawing Sheets

(51) Int. Cl.

| | | |
|---|---|---|
| H04N 21/231 | (2011.01) | |
| H04N 21/24 | (2011.01) | |
| H04N 21/2662 | (2011.01) | |
| H04N 21/4402 | (2011.01) | |
| H04N 21/643 | (2011.01) | |
| H04N 21/845 | (2011.01) | |
| H04N 19/115 | (2014.01) | |
| H04N 19/164 | (2014.01) | |
| H04L 29/08 | (2006.01) | |
| H04N 21/2343 | (2011.01) | |
| H04N 21/236 | (2011.01) | |
| H04L 29/06 | (2006.01) | |

(52) U.S. Cl.
CPC ........... *H04N 19/164* (2014.11); *H04N 19/40* (2014.11); *H04N 21/231* (2013.01); *H04N 21/23106* (2013.01); *H04N 21/23439* (2013.01); *H04N 21/23605* (2013.01); *H04N 21/234309* (2013.01); *H04N 21/2402* (2013.01); *H04N 21/2662* (2013.01); *H04N 21/44029* (2013.01); *H04N 21/64322* (2013.01); *H04N 21/8456* (2013.01); *H04L 69/16* (2013.01); *H04L 69/324* (2013.01)

(58) Field of Classification Search
CPC ....... H04N 21/23439; H04N 21/23605; H04N 21/2402; H04N 21/2662; H04N 21/44029; H04N 21/64322; H04N 21/8456

See application file for complete search history.

(56) References Cited

FOREIGN PATENT DOCUMENTS

| | | | |
|---|---|---|---|
| WO | 2010/108045 A1 | 9/2010 | |
| WO | WO-2010108045 A1 * | 9/2010 | ............ G06F 15/16 |

* cited by examiner

IP1:
eNodeB IP
MME IP

SCTP:
eNodeB port
MME port body

Packages transmitted between eNodeB and
MME for establishing a tunnel

IP1:
eNodeB IP
S-GW IP

UDP:
eNodeB port
S-GW port

GTP_U:
teid

} Tunnel heading

IP2:
EU IP
Server IP

TCP/UDP:
EU port
Server port

} User's heading

HTTP
body

Data

Packages for sending data from user to
server and back

FIG 7

CONTROLLING THE TRANSMISSION OF A VIDEO DATA STREAM OVER A NETWORK TO A NETWORK USER DEVICE

FIELD OF THE INVENTION

The present disclosure relates to delivering data; in particular, to a controller and to the way of controlling video data streaming via a network to a network user device.

BACKGROUND OF THE INVENTION

A significant part of the data transferred via mobile networks is video traffic in the streaming mode. The most modern streaming technology is dynamic adaptive streaming over HTTP. This technology is used, for example, by HTTP Live Streaming (Apple), Smooth Streaming (Microsoft), HTTP Dynamic Streaming (Adobe) and DASH standard. In this technology, the server stores several copies of a video file, each one coded with different parameters, for example, different resolutions and bit rates. The higher the bit rate is, the faster radio channel you need to transfer the video and the higher the quality of individual frames will be. The copies are split into independent segments synchronized by time. This allows you to rewind forward without loading all the segments, and also to switch between different bit rates when necessary.

From the client's point of view, video quality is perceived as good not only when its bit rate is high but also when there are no delays (also known as stallings) in playing. These delays appear when the client's input buffer becomes empty, i.e. the client is watching the video segments quicker than they are coming via the radio channel. When using a mobile network, one of the reasons for that is that the base station to which the client is connected has a limited time-and-frequency resource. This resource, in its turn, can be exhausted when it is congested by a large number of clients connected to the same base station. Because of the congestion, the transfer rate in the radio channel becomes lower for the most clients than the bit rates available on the server, leading to delays in playing.

From the prior art, we know ways to control video data flow via a network. For example, European patent 1872536 which is the closest analogue of the applied invention describes a way to control the transfer of data packages from the server to a client when the server switches between different versions of streaming, depending on the state of the client's buffer. The same multimedia contents, for example, a particular video sequence is preliminarily coded with various bit rates and stored on the server. However, this method requires storing a huge number of versions for each data flow. Moreover, even having a lot of versions does not guarantee that for every particular case the best possible version will always be available.

Hence it appears that there is a need for a new technical solution about the control over network streaming of video data to a user device which would provide high speed, simplicity, efficiency, minimum loss in quality and maximum satisfaction of the users.

SUMMARY OF THE INVENTION

The objective of the present invention is creating a controller along with a way of controlling video data transfer which would make it possible to change the amount of video data transferred over a radio channel from the base station to a client, in order to optimize the transfer.

The said problem is solved by a special method of controlling the network data stream to a user device. The method is storing video segments in a data storage, receiving a request from at least one network user device, determining the current parameters of this device, transforming the stored video segments on the base of these parameters, and sending the transformed segments to the user device as a response to the request. According to this method, the stored video segments are transformed by changing the bit rate via transcoding every segment in real time.

The technical effect obtained by the invention is a smaller average number of delays (stallings) when playing video, and smaller load on the provider's core and transit network. The effect is provided by changing the amount of video data by their segment-by-segment real-time transcoding into bit rates lower than the bit rates of the top-quality copies stored on the server.

In one of the possible embodiments, video segments are saved in the data storage when the first request for these video data has been received from a network user device.

In one of the preferable embodiments, the stage of saving video segments in the data storage includes the stage of caching these segments.

In another embodiment, the current parameters of a network user device include at least one of such parameters as the current capacity of the device channel, the state of the user's buffer and the tariff.

In another preferable embodiment, the stored video segments are transcoded at the hardware level.

In another embodiment, the stored video segments are transcoded with changing their resolution.

In another preferable embodiment, when filling up the data storage, the video segments saved in it are selected according to the requests for saved video data from the network user devices.

In another embodiment, the selection is based on the frequency of requests for particular video data from the network user devices. Videos with the highest request frequency have a priority.

In another embodiment, the selection is based on removing videos whose last received request is the oldest one.

In one more embodiment video segments additionally contain audio or/and text data.

The said problem is also solved by proposing a controller responsible for the network transfer of video data flow to a user device. The controller contains at least one data storage suitable for storing video segments, and at least one controlling block. The controlling block of the controller is able to receive a request from at least one network user device and determine the current parameters of at least one network user device. The video segments stored in the data storage can be altered by changing their bit rates via transcoding every segment in real time according to the current parameters of the user device determined by at least one controller. Besides, the controller contains a network interface which can send the altered video segments to at least one network user device.

In another embodiment, at least one controlling block contains at least one scheduler.

In another embodiment, the scheduler provides the possibility to choose a bit rate for sending video segments to the indicated user device as a response to a request from at least one user device according to the determined current parameters of the network user device.

In another embodiment, the video streaming controller is placed in a network which contains at least one user device, at least one base station, at least one gateway and at least one content server.

In another embodiment, the controller is designed in such a way that no user device, no basic station, no gateway and no content server receive any information about the presence of this controller in the network.

The said problem is also solved by a device which contains a proxy block capable of receiving requests from at least one network user device, a caching block to store video segments, and a scheduler which can determine the current parameters of at least one network user device. Besides, the device contains a transcoding block which can alter the video segments stored in the caching block via changing their bit rate and/or their resolution by means of transcoding each segment in real time according to the current parameters of a user device, and a network interface which can send the altered video segments to at least one network user device.

In one more embodiment, the proxy block can work at the network level.

These and other aspects of the invention will be clear from the subsequent description of the preferable embodiments, drawings and summary of invention. Details of one or several examples of the implementation of the invention are shown on the additional drawings and in the subsequent description. Other distinctive features, problems and advantages of the inventions will be evident from the description, drawings and claims.

DETAILED DESCRIPTION OF THE PREFERRED EMBODIMENTS

Figure 1:
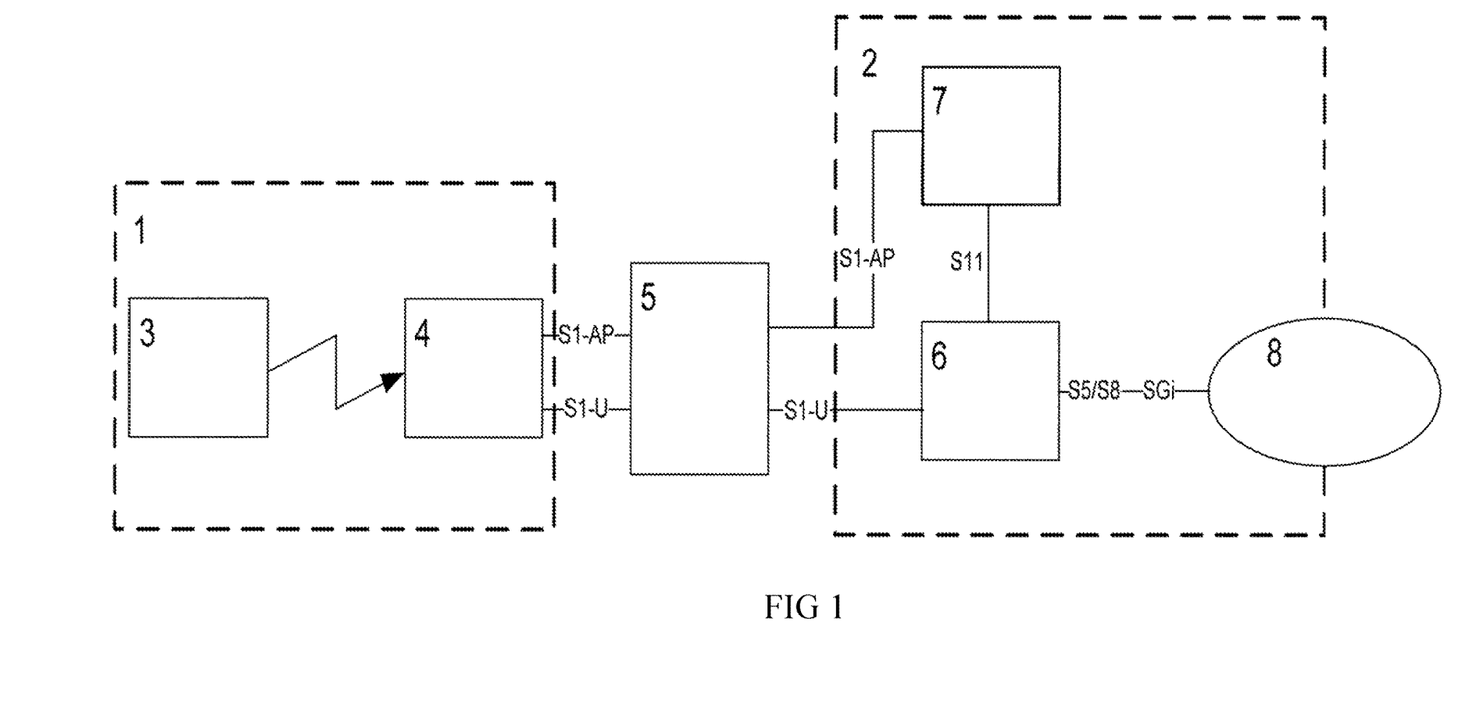
FIG. 1 illustrates the logical structure of the network and the positioning of the controller in the network according to the present invention.

FIG. 1 illustrates the logical structure of the network which consists of two parts. The first part is a transit network 1 (E-UTRAN) responsible for the radio access. It consists of the base stations 4 (eNodeB) and user devices 3 (UE, user equipment). The second part is a core network 2 (EPC, Evolved Packet Core) responsible for providing the required quality of the service (QpS), mobility control, authentication, billing, etc. Logical nodes of these networks use standardized protocols for communication. The controller 5, according to the present invention, is placed between the first and second parts. The controller 5 works on so-called interface S1.

The conventional centralized placement of the proxy server with a cache in the core network decreases only load on the Internet gateway, being unable to unload the transit network. The proposed solution uses a distributed placement of the proxy server inside the transit network, making it possible to decrease the load on the transit network channels. The controller, according to the present invention, is placed on the edge of the transit network, diminishing the load on the transit channels. Such a placement is possible due to the use of a proxy block. Besides, this placement in the logical hierarchy of the network allows the operator to position the controller 5 at various levels of the physical network: from a base station 4 to the points aggregating the traffic from tens of base stations 4. In addition to that, the hardware and software platform of the controller 5 is scalable by the number of processing modules and data storage systems, making it possible for the operators to use this invention in their networks in the best way in terms of efficiency and low costs.

Figure 7:
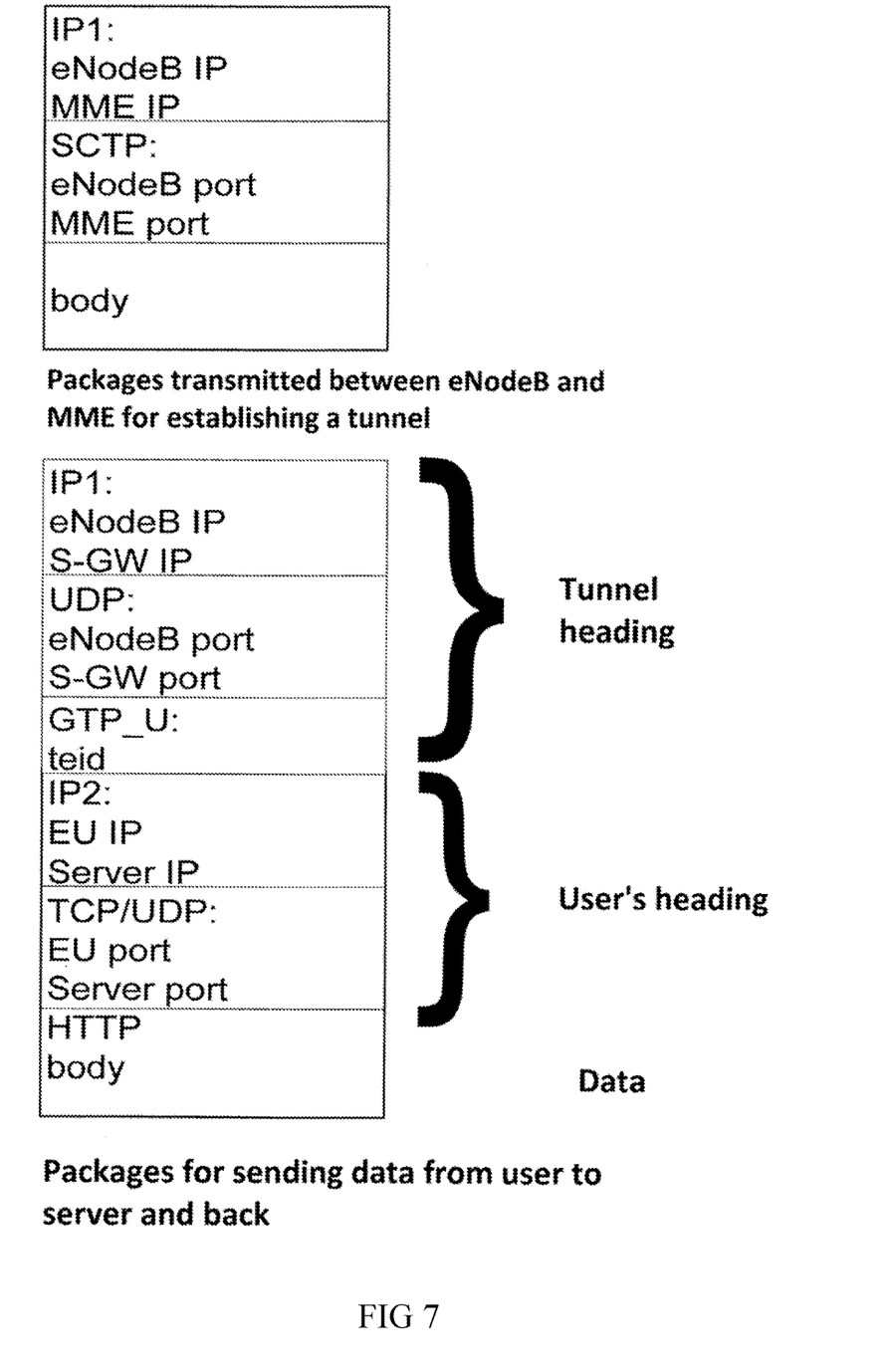
FIG. 7 gives examples of packages with which the device works.

In a mobile network, data are transmitted inside a tunnel. Packages whose non-restrictive formats are shown in FIG. 7 are sent from the user device 3 to the base station 4, then transmitted via a tunnel connection to the serving gateway 6 where they are taken out from the tunnel and sent to the core network 2. Tunneling provides the required quality of service for various types of traffic from different clients by the transit network. The tunnel is controlled by the protocol S1-AP, while the transmission inside tunnel is controlled by S1-U. The proxy block acts as a transparent proxy server, i.e. the proxy function is implemented for both the tunnel itself and the connection inside it. Thus, the optimization and video traffic caching are transparent for both the user device 3 and content server 8 with the video data; and also for the base station 4 and the serving gateway 6, without significant changes for the headers of the transmitted packages. This allows us to simplify the integration of the controller 5 into the existing network, as we do not need to change the configuration of the user device 3, the base station 4 and the gateway 6.

Another advantage of such a placement is a smaller delay of the transmitting channel due to the use of a proxy server. The video data are transferred by the Transmission Control Protocol (TCP) which guarantees reliable delivery. In the framework of this protocol, the content server chooses the rate to send the data to the client in accordance with the rate of the compound logical channel, i.e. the channel consisting of a radio subchannel and a subchannel which includes some parts of the transit network, the core network and Internet. These two subchannels have different characteristics, therefore the rate of the compound logical channel is basically determined by the rate of the channel with worse characteristics (which is the radio channel), affecting the speed of the TCP connection, Proxy server makes it possible to provide two different logical connections for each subchannel, with independently chosen TCP parameters. This can significantly reduce the delays in delivering the video data.

In the packet network, the users data are transmitted via channels for a stream of IF packets with a certain quality of service. The connection of a user device 3 with an external Internet server 8 is called a end-to-end bearer. It consists of several channels established between the logical nodes in the transit network 1 (E-UTRAN) and the core network 2 (EPC) by protocols like S1-U, TCP, HTTP, etc.

The set of protocols S1 consists of two parts: S1-U and S1-AP. The protocol S1-U directly provides the transfer of S1 tunnel stream via the IF network, while the protocol S1-AP provides that the channel E-RAB is established between a user device 3 and the serving gateway 6; in particular, the tunnel S1 (a component of the channel E-RAB) is established between the base station 4 and the serving gateway 6. S1 tunnel stream is a stream of IF packets between the base station 4 and the serving gateway 6 in which IF packates of the user device 3 are tunneled.

The IP tunnel of the protocol S1-U is implemented by the protocol GTP-U and also by UDP transport protocol. The end points (input/output) of the tunnel are the base station 4 and the serving gateway 6 (i.e. the added IF header contains the IF addresses of the base station 4 and the serving gateway 6).

Figure 2:
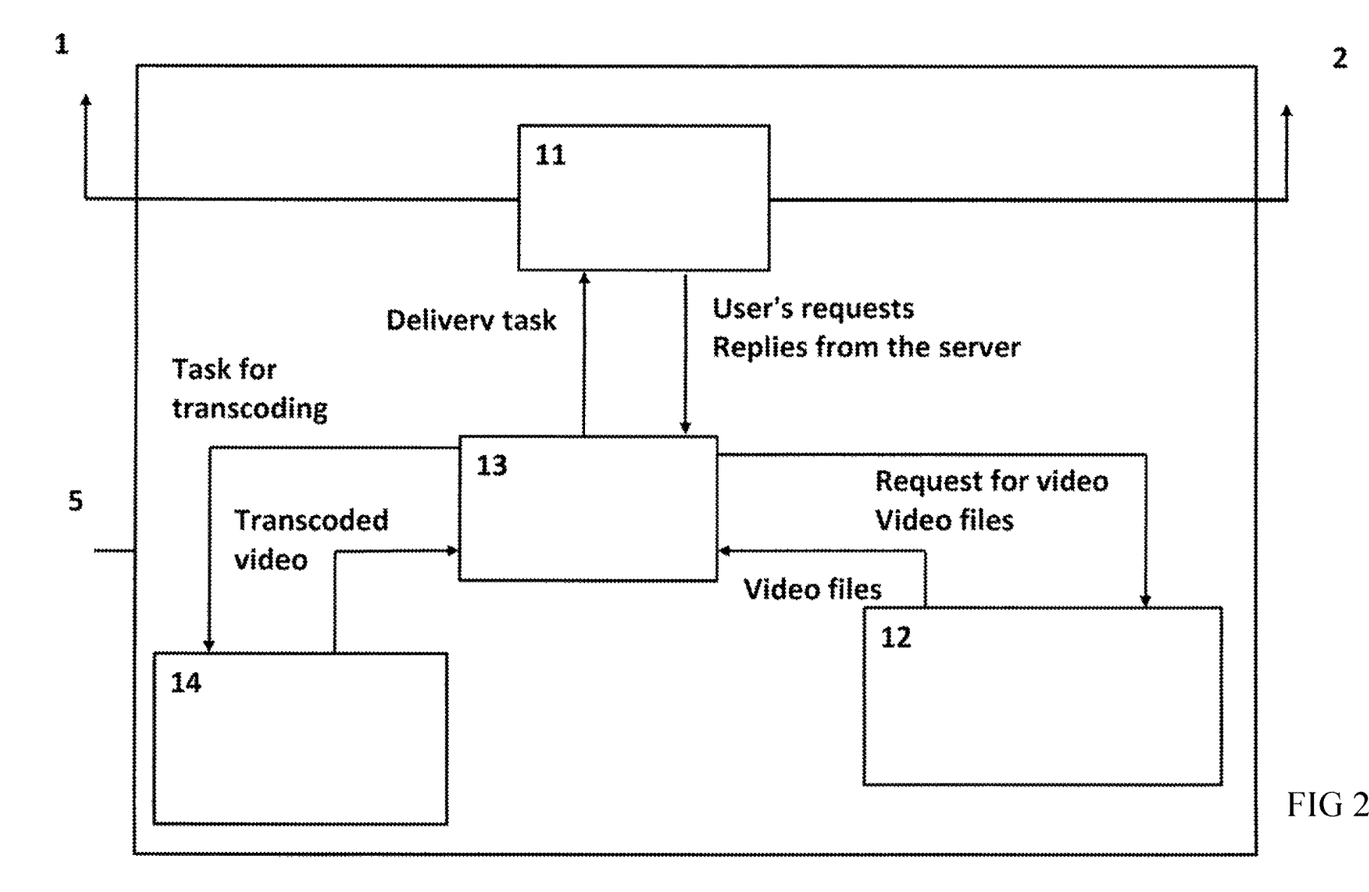
FIG. 2 illustrates the interaction between the functional blocks of the device according to the invention.

FIG. 2 shows the scheme of interaction between the blocks of controller 5. According to the present invention, the controller 5 contains a proxy block 11, a scheduler 13, a transcoding block 14, a caching block 12 and network interfaces 23 which can send video data to a user device 3.

Figure 3:
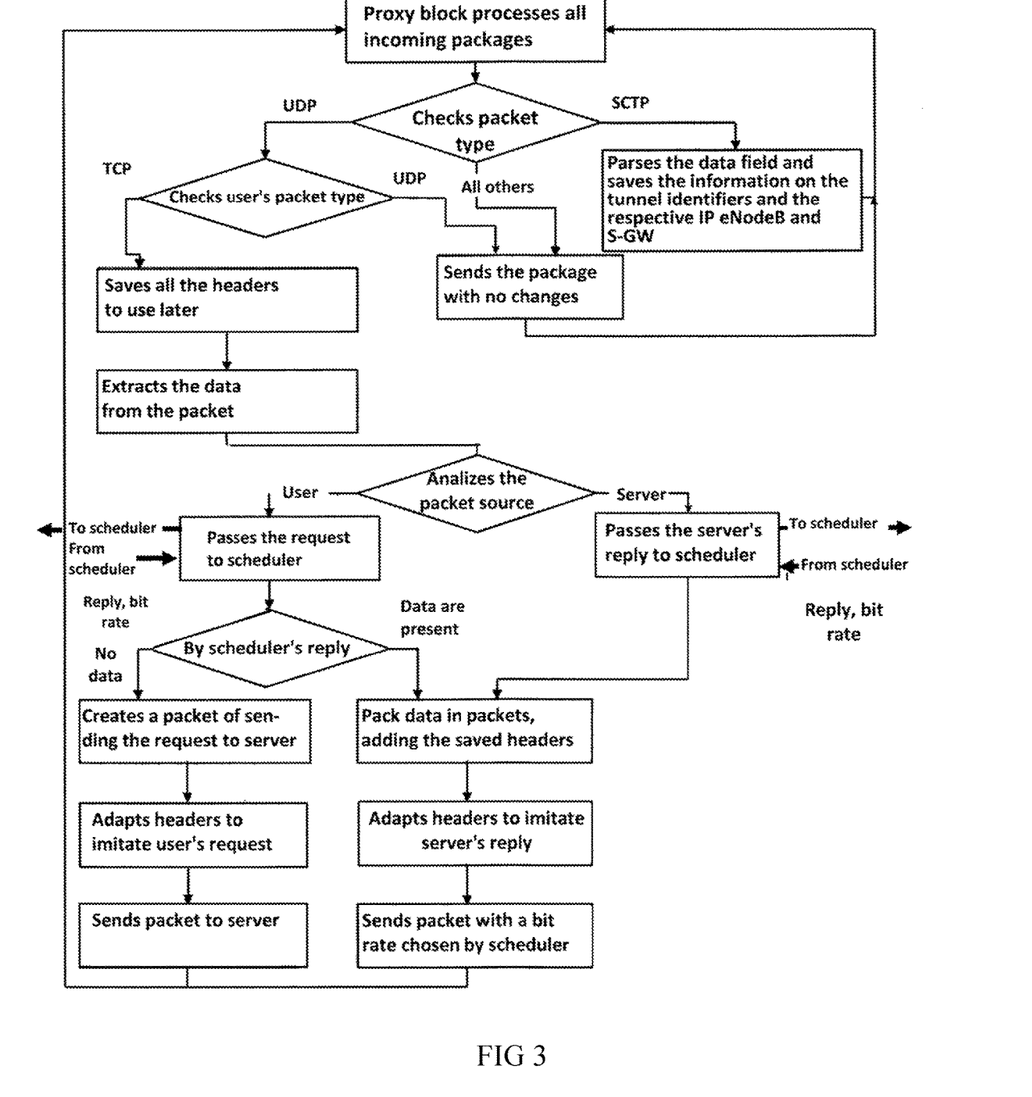
FIG. 3 illustrates the principle of the proxy block functioning according to the invention.

The proxy block 11 whose functioning is illustrated in FIG. 3 works at the network level, intercepting and analyzing all the packets passing through it. In other words, it consecutively expands the tunnel level (IP1) between the base station 4 and the serving gateway 6 and then analyzes the embedded packet in order to determine its type (TCP, UDP). Thus, the work at the network level allows the proxy block 11 to have an access to packetes not addressed to it. Neither the content server 8, nor the user device 3, nor the base station 4, nor the serving gateway 6 receive any information about the interference or even existence of the proxy block 11, because after the headers of the packets are processed, the proxy block adapts them in a special way imitating their response from the content server 8 to a user device 3. UDP packets are sent without any change, but TCP packages are processed in the following way. When a request is received from at least one network user device 3, the proxy block determines the current parameters of this device 3. When a connection is established between the user device 3 and the content server 8, the proxy block breaks the tunnel between the base station 4 and the serving gateway 6. To do that, the proxy block scans all the passing packets determining their types. For UDP packets containing TCP packets embedded into them, the headers are saved in the memory with Correspondence tables: IF address+user device port and all the data of the tunnels from the base station 4 to the serving gateway 6 and back, numbers of tunnels teID such as IF+base station port, IF+serving gateway port, numbers of tunnels teID, IF+content server port, and others. The tunnel numbers are intercepted front the analysis of the SCTP traffic between the base station 4 and the mobility management entity (MME) 9 before the tunnel is established. To analyze this traffic, an additional syntactical packet analyzer is used. After the headers are saved, data are extracted out of the packets. If the data contain a request for video data from the user 3 to the content server 8, this request is passed for the service to the scheduler 13. If the scheduler replies with a refusal, the request is passed to the content server 8 on behalf of the user 3. If the scheduler returns the requested video and the bit rates calculated for its transfer, the proxy block 11 forms packets out of the video data, adapting the headers on the base of the saved tables in the way to imitate the response from the content server 8 to the user 3.

If the data contain a file to pass to the user 3, it is sent to the scheduler 13 to be passed to the caching block and transcoded if necessary. The scheduler replies with the information about the transfer bit rate and the transcoded video. After that, the proxy block 11 forms packets out of the video data, adapting the headers on the base of the saved tables in the way to imitate the response from the content server 8 to the user 3.

Figure 4:
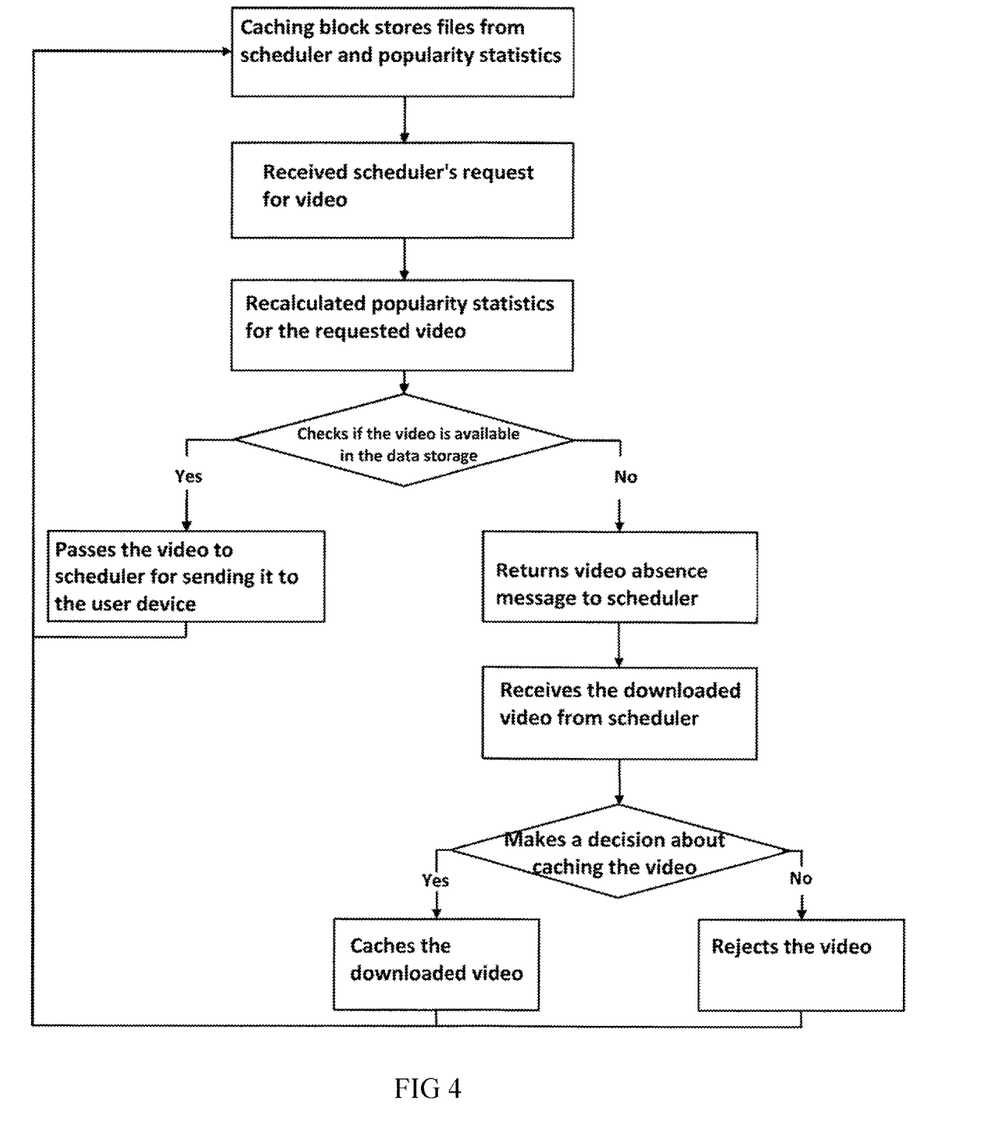
FIG. 4 illustrates the principle of the caching block functioning according to the invention.

The caching bock 12 whose functioning is illustrated in FIG. 4 includes a data storage (for example, a solid-state drive, a hard disk drive, their possible combinations, etc.), storing the popularity information received from the proxy server and the most popular videos in low and high resolution. When information arrives about a newly loaded video, the caching block 12 makes a decision about saving it (in particular, in the cache) on the base on its own video popularity statistics, meta-data from the content server 8, the video age, its popularity in the network and the amount of links to it on HTML pages. When a request from the scheduler 13 is received, the caching block 12 refreshes the popularity statistics and checks whether such a video is contained in the cache. If it is, the caching block 12 puts the video into the queue to be sent to the scheduler 13. If after the first request for this video it is not found in the cache, the caching block 12 returns a refusal to the scheduler 13. If a video is received from the scheduler 13, the caching block analyzes the popularity statistics for this video and makes a decision about saving it.

Figure 5:
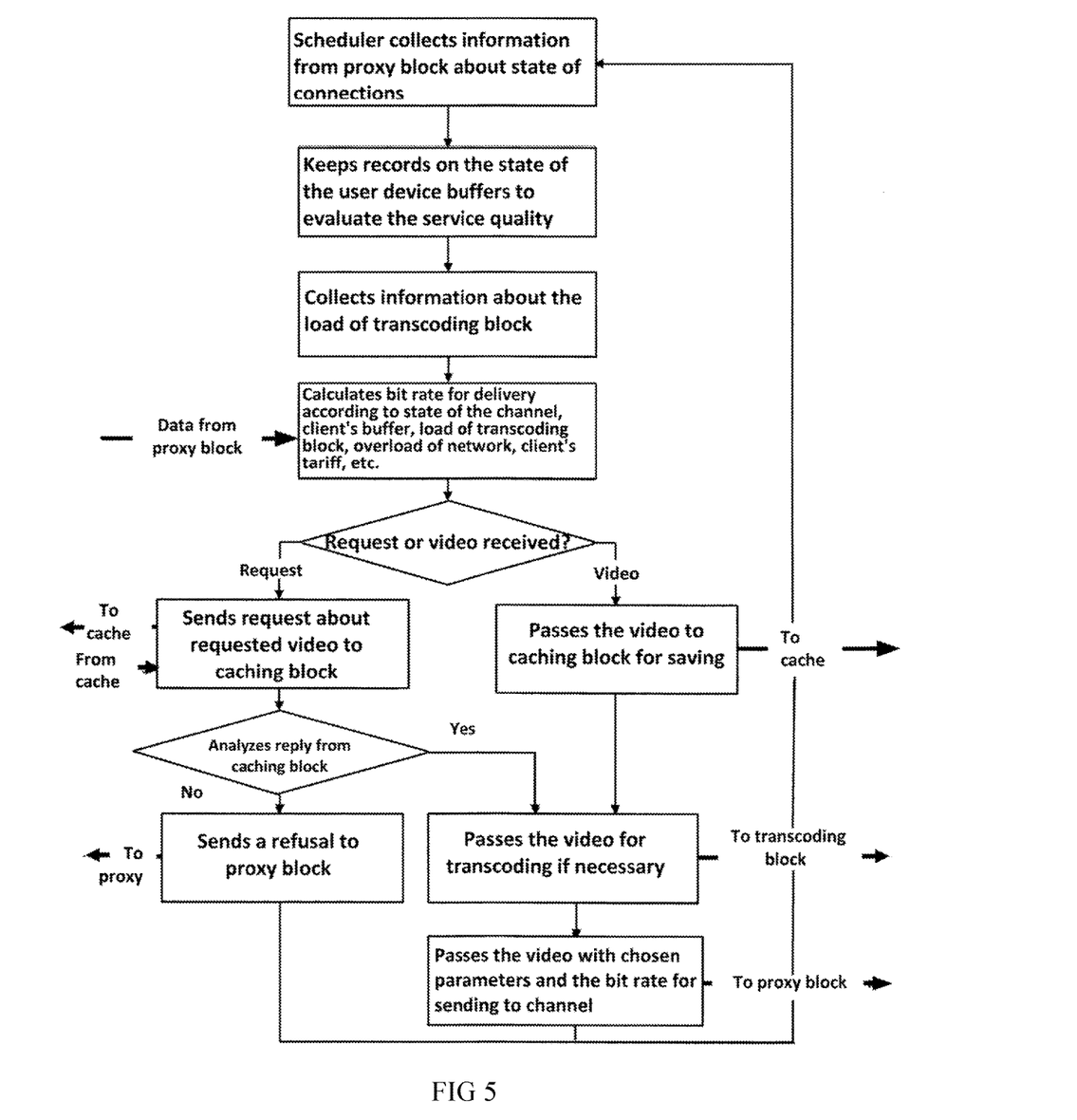
FIG. 5 illustrates the principle of the scheduler functioning according to the invention.

The scheduler 13 whose functioning is illustrated in FIG. 5 estimates the current capacity of the channel of the user device 3: in particular, the state of the network, the buffers of the supported user devices 3, their tariffs, the resource necessary for the next transfer, and the load of the transcoding block 14. After that, it makes a decision about the bit rate for the given user, in particular, if the channel and the transcoding block 14 have some free resources, the scheduler 13 decides to send the video data in the mode required by the user. If the resources of the channel and transcoding block 14 are not enough, they are distributed according to the priority of the user device. User devices with low priority get only residual resources. According to the calculated resource, the block 14 transcodes the video data. After the transfer rate is chosen, depending on the request from the proxy block 11 for data search or for transfer, the scheduler can request for video data from the caching block 12 with required parameters, if a request has come from a user 3. If the data are found, they will be passed to the proxy block 11 after the transcoding, if necessary. If the video is not found, the scheduler will return a refusal. If a video is received from the content server 8, then after possible transcoding it will be passed to the proxy block, along with the information about the required rate of its transfer to the user 3. The transcoding block 14 changes the bit rate or the resolution of the stream of the video segments saved in the caching block 12 or received by the network, by means of transcoding every video segment in real time by demand from the scheduler 13 according to the current parameters of the user device 3. If the transcoding block 14 has free capacity, it preliminarily transcodes the most popular videos into lower bit rates, so that if the network is overloaded, a part of its load will move to the caching block 12.

According to the present invention, when the scheduler 13 is overloaded, it starts to prioritize the video streams sent to the user devices 3 in accordance to the users tariffs (for example, Gold, Silver and Bronze). Due to the prioritization, the time-and-frequency resource is redistributed among the users, i.e. the channel rates grow for some users and drop for others. According to the protocols of dynamic adaptive streaming, the users start to request their next video segments in accordance with the channel rates of their devices 3, determined by the scheduler 13. For some users, the channel rate can turn out to be lower than the minimum available bit rate on the content server 8. In this case, for such users, the transcoding block 14 starts transcoding the requested video data in real time, providing the quality which would match the current rates of the channels, This minimizes the general number of buffer-emptyings for the user devices, whatever their tariffs are.

Such a speed is possible only when using hardware transcoding which is a unique feature of the present invention. It also can provide a much higher performance with a lower consumed power, as compared to the solutions using software transcoding. When there is no congestion, hardware transcoding also allows us to rapidly recode the video data in the caching block 12 into lower bit rates in order to prepare the caching block 12 for an congestion of the base station 4. In this case, when the congestion has already occured and the radio channel capacity is not enough, the video data will be sent to the user devices from the caching block 12.

The transcoding block 14 is built on the base of a multi-processor hardware implementation of a video codec, providing real-time transcoding of several video streams. At a request from the scheduler 13, the transcoding block 14 starts transcoding every video segment from the caching block 12, consequently passing the coded fragments to the proxy block 11 to pack them in packets and send to the user device 3. In the case when the video was not found in the caching block 12, transcoding is impossible without caching: for example, if the requested video is not popular. Specifically, the scheduler 13 sends the video data from the proxy block 11 to the transcoding block 14 which performs their segment-to-segment transcoding in real time and returns the transcoded segments back to the scheduler 13, without any considerable delay in the transfer process. In order to successfully perform all its functions, the transcoding block 14 can support such stream data formats as MP2-TS, MP4, WebM, and others.

Delays can be possibly added to the transfer process if the scheduler 13, when redistributing the resources between the user devices 3 at the scheduling stage, makes a decision about delaying the traffic for the finite recipient of the video. In this case, the functioning of the transcoding block 14 is defined as follows: the transcoded segments can temporarily, until their dispatch, be accumulated in the caching block 12, or the transcoding can start each time before the next video data package is sent, and the delay time can be used for transcoding video segments for other user devices 3 with a higher priority or with a lower satisfaction.

The present invention uses hardware codecs for transcoding, for example, the codec of h.264 format (QuickSync technology) used in modern processor architectures, in particular, Intel processors (Sandy Bridge, Ivy Bridge, for example Intel Xeon E3-1275) and others, Media SDK library which uses QuickSync technology can transcode up to 8 video streams in HD or up to 16 video streams from HD to SD, on just one computational module. The controller 5 can include several computational modules, a load balancer distributing jobs between them. This allows us to linearly scale the performance of the transcoding block 14, adding new computational modules.

High speed of the transcoding leads to a higher efficiency of caching. The possibility appears to rapidly obtain several versions of the same cached video with different bit rates and resolutions.

Besides, quick transcoding makes it easier to rapidly react to the congestion of the base stations 4, performing real-time transformation of the video data sent to the user devices 3 whose radio channel rate is lower than the minimum bit rate of the video on the content server 8.

According to the present invention, the transcoding block 14 can support various stream formats suitable for video data. In particular, data in a certain stream format can store not only video segments but also text (for example, subtitles) and audio data (for example, a soundtrack). Before the transcoding starts, the transcoding block 14 splits the video data of a particular stream format into several data streams. After the transcoding is finished, it assembles them together again.

The present invention supports intellectual caching algorithms of predictive and proactive types. A proactive algorithm uses statistical information about users' requests to the content provides, and not just the information about the requests passing through a particular controller 5 but also the information from other controllers 5. This ensures a high efficiency of getting into the caching block 12 even for the devices on the edge of the network.

A predictive algorithm uses various meta-information about the popularity of a certain content from the sites of the content servers 8, using traffic analysis methods to accumulate statistics on possible downloads of the contents. For example, a caching block supporting this algorithm accumulates the statistics about the amount of requests for particular videos on social networks, web pages, etc, passing through a particular server. This makes it possible to preload the data which will probably be requested by the users in the near future.

When the free room in a data storage is filled up with saved video data, there comes the necessity to clear it again. On the base of statistical analysis of the requests, the caching block 12 can pick out and store the most popular video files out of the transferred data, and also make a selection in order to remove the least popular ones from the storage. The present invention supports such caching policies as LFU and LRU which can be used either together or separately. In other embodiments, the present invention provides joint or separate usage of other caching policies, LFU policy gives preference to videos with the highest request frequency. LRU policy gives preference to videos requested recently; i.e. it is based on removing the videos the last request to which was the oldest. Thus, the present invention assumes a frequent change of the subset of popular videos, using a hybrid solution which combines both these policies.

Figure 6:
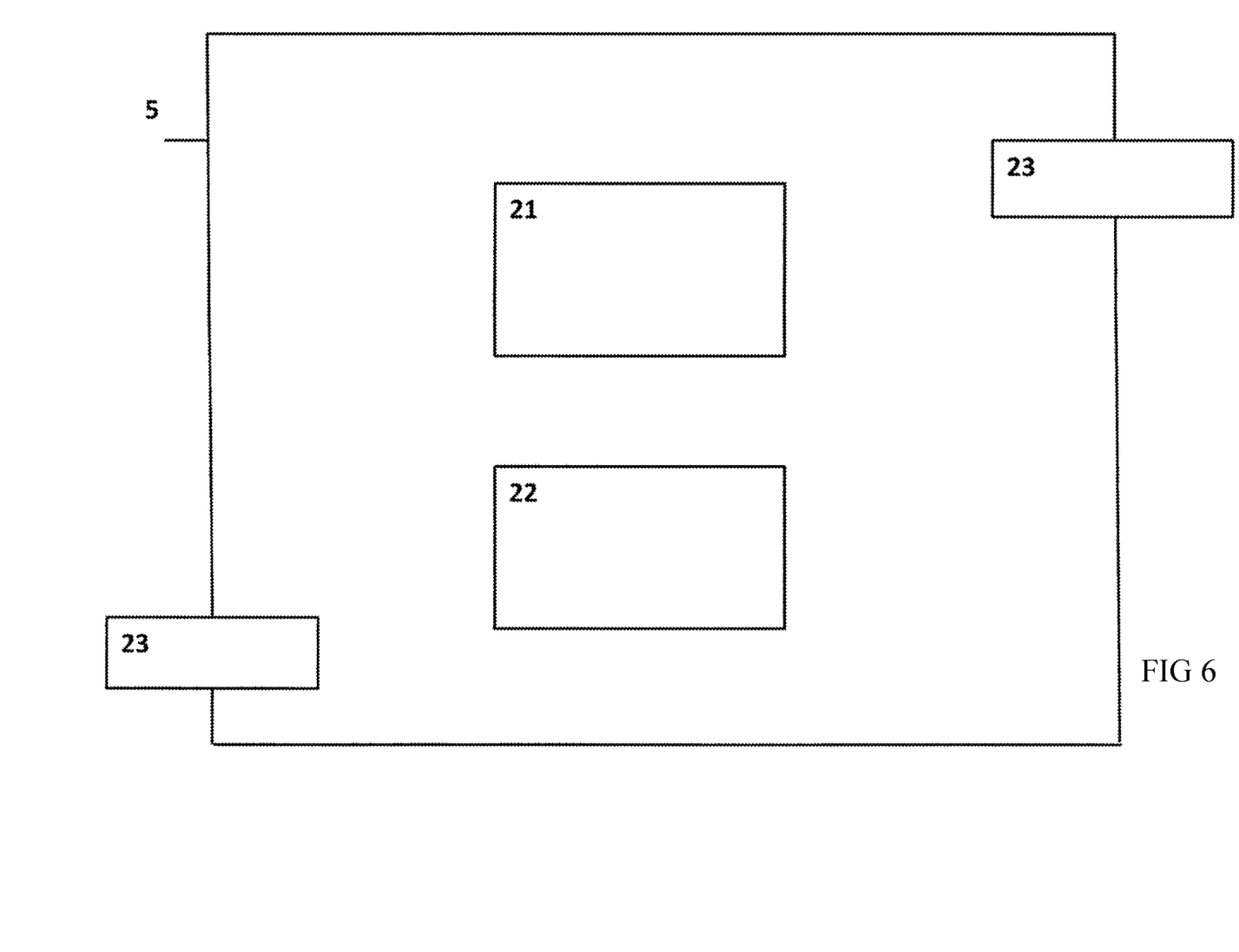
FIG. 6 gives an example of implementing a controller for network video data streaming to a network user device according to the invention.

In order to provide high efficiency, the caching block 12 supports both parallel requests from several processes of the proxy block 11 and requests from several proxy blocks 11 placed on several computational modules. One caching block 12 on a separate hardware device can support several proxy blocks 11 working with different basic stations 4. In one of the embodiments, the proxy block, the transcoding block and the scheduler can be united in a controlling block 21 (FIG. 6). FIG. 6 shows a structural scheme of the controller 5 according to the present invention, which contains at least one controlling block 21; at least one data storage 22 capable of storing video segments and network interfaces 23 to connect the controller 5 with the transit network 1 and the core network 2 in order to send the video segments to the user device 3.

The foregoing description serves as an example and should not be considered limiting. Experts will understand variations and modifications of the open examples which do not deviate from the gist of the present invention.

What is claimed is:

1. A device for transmission control of a video data stream in a mobile operator network, the device being situated in a packet network for IP packets stream transmission, the packet network comprising a transit network and a reference network and at least one user device, at least one base station, at least one gateway and at least one content server, the device comprising:
- at least one control device situated in the transit network between the at least one base station and the at least one gateway, the at least one control device being configured to receive and send all IP packets passing between the at least one base station and the at least one gateway, and comprising interconnected a proxy unit, a caching unit, a scheduler, a transcoding unit, and network interfaces;
- the proxy unit being configured to:
- intercept and analyze the IP packets passing between the base station and the gateway;
- save tunnel data of incoming IP packets and addresses corresponding to the at least one base station and the at least one gateway;
- detect IP packets transmitted by a SI-U protocol and extract TCP packets wrapped in the IP packets, save packets headers and extract data from the headers;
- transmit these data to a scheduler in case of detecting data containing a request for video data from a network user device to the at least one content server or containing a request for video data transmission from the at least one content server to the network user device;
- create an IP packet for sending a request of the network user device to the at least one content server, adapt the packet headers to imitate a request from the network user device, and send the IP packet with a request from the network user device to the at least one content server in case of getting a response from the scheduler that the requested data are not present in the data storage of the caching unit;
- form the IP packet out of the video data, add previously saved packet headers and adapt headers to imitate a response from the at least one content server and send the IP packet to the network user device in case of getting user device video data from scheduler as requested by the network;
- the scheduler being configured to:
- collect information about the connections state from the proxy unit; determine current parameters of the at least one network user device; take into consideration a buffer state of user devices; receive video data from the proxy unit and transmit the data to the caching unit storage;
- receive from the proxy unit data containing a request for video data from the network user device to the content server or containing a request for video data transmission from the content server to the network user device and send a request to the data storage of the caching unit;
- estimate the carrying capacity of a user device channel, required channel resource and calculate the bit rate for video segments transmission to at least one network user device based on the determined current parameters;
- analyze the response to the request from the caching unit data storage; if the requested video data are absent in the caching unit data storage, send a refusal to the proxy unit: and
- analyze the response to the request from the caching unit data storage;
- and, if the requested video data are present in the caching unit data storage, send a task to a transcoding unit to transcode video data on the basis of the determined current parameters of the network user device;
- receive the requested video data from the transcoding unit transcoded in accordance with the channel carrying capacity of the user device, and dispatch the video data to the proxy unit together with the information about the required transmission rate for the dispatch;
- the caching unit comprising data storage allowing segments of video data and popularity statistics of video data to be stored and being configured to:
- receive requests for video data from at least one scheduler;
- recalculate the popularity statistics for the requested video data;
- check whether video data are present in the caching unit data storage;
- transmit to the scheduler for the dispatch to the user device video data or a message about theft absence;
- receive video data from the scheduler and make a decision about their caching; the transcoding unit being configured to:
- change stored in the caching unit video data segments by means of the bit rate change by transcoding every segment in real time on the basis of the determined current parameters of the network user device;
- receive from the scheduler a task for transcoding of video data and transmit to the proxy unit the transcoded video data for packing in packets and sending to the network user device;
- receive from the scheduler a task for transcoding of video data, transform the video data sent to the network user device in real time; and
- the network interface allowing unaltered or altered segments of video data to be transmitted to at least one network user device.

2. The device of claim 1, wherein the scheduler is configured to allow to choose a bit rate for video segments transmission to a specified user device in response to a request from the at least one user device on the basis of determined current parameters of the network user device.

3. The device of claim 1, wherein the caching unit is configured to save video data segments after the proxy unit has received the first request for the video data from the network user device.

4. The device of claim 1, wherein the video data segments saved in the caching unit represent cached segments of video data.

5. The device of claim 1, wherein the current parameters of the network user device comprise at least one of such parameters as the current carrying capacity of the network user device channel, state of a user device buffer and a tariff.

6. The device of claim 1, wherein transcoding of the stored video segments represent hardware transcoding.

7. The device of claim 1, wherein the above-mentioned transcoding unit allows the resolution of the saved video data segments to be changed by their transcoding.

8. The device of claim 1, wherein the caching unit, when the data storage is filled up, is executed with the possibility to perform sampling from the saved video data segments on the basis of requests for the mentioned saved video data from the network user devices.

9. The device of claim 8, wherein said sampling is based on the frequency of requests for the mentioned video data from the network user devices.

10. The device of claim 8, wherein said sampling is based on deleting video data the last request for which accepted by the mentioned proxy unit is the oldest one.

11. The device of claim 1, wherein the video data segments additionally contain audio data and/or text data.

12. The device of claim 11, wherein the proxy unit allows to work at the network level.

13. The device of claim 12, wherein the device is configured to control video data stream transmission over the network in such a way that none of the user devices, none of the base stations, none of the gateways and none of the content serves receive information about the presence of the said control device in the network.

14. A method of controlling video data stream transmission in a mobile operator's network to the network user device, the method comprising:
receiving a request for video data from at least one network user device situated in the packet network for IP packet transmission, consisting of the transit network and the reference network and including at least one user device, at least one base station, at least one gateway and at least one content server;
installing the control device in the transit network between the base station and the gateway which comprises connected with each other proxy unit, caching unit, scheduler, transcoding unit and network interfaces;
saving the video data segments obtained from the content server in the data storage of the caching unit;
intercepting IP packets passing between the base station and the gateway, expanding the tunnel level and analyzing the IP packets in the proxy unit;
saving the tunnels data of the incoming IP packets and connected with them addresses of the base station and the gateway in the proxy unit;
in case of detecting IP packets in the proxy unit transmitted by S1-U protocol, extracting TCP packets wrapped in it, saving the TCP packet headers and extracting data from them;
in case of detecting data in the proxy unit that contain a request for video data from the network user device to the content server or video data for transmission from the content server to the network user device, transmitting said data to the scheduler;
estimating the current capacity of the user device channel, the required channel resource at the scheduler, and calculating the bit rate for transmission of the video data segments to at least one network user device on the basis of the determined current parameters;
sending a request for video data from the scheduler to data storage of the caching unit together with the information about the calculated required transmission rate;
comparing the request with the video data available in the caching unit data storage and transmitting the response to the scheduler;
analyzing the obtained response in the scheduler and if the requested video data are absent in the caching unit data storage, sending a refusal is to the proxy unit; in the presence of the requested video data, sending the video data to the proxy unit together with the information about the required transmission rate with a bit rate corresponding to the current rate of the user's radio channel, and if the transmission rate for the dispatch of the requested video data is lower than the minimum available bit rate at the content server, sending a task for transcoding of video data on the basis of the determined current parameters of the network user device to the transcoding unit;
transcoding the video data in the transcoding unit on the basis of current parameters of the user device in accordance with capacity of the user device channel and sending the transcoded video data via the scheduler to the proxy unit;
forming the IP packet in the proxy unit from the obtained video data adding to the data previously stored headers and adapting the headers to imitate a reply from the content server, and sending the packets at the rate chosen by the scheduler to the user device;
in case of the refusal from the scheduler, creating the IP packet in the proxy unit to transfer the user's request to the content server, adapting the packets headers to imitate a request from a network user device and sending the IP packet with the request of the network user device to the content server.

15. The method of claim 14 wherein the current parameters of the network user device include the current capacity of the network user device channel, the state of the user's buffer and the tariff.

16. The method of claim 14, wherein said transcoding of the saved video data segments represents hardware transcoding.

17. The method of claim 14, wherein said transcoding comprises resolution change of the video data segments.

18. The method of claim 14, wherein in case of filling up the data storage, sampling is performed from the saved in it video data segments on the basis of the requests for the saved video data from the network user devices.

19. The method of claim 18, wherein said sampling is based on the requests frequency for the saved video data from the network user devices.

20. The method of claim 18, wherein said sampling is based on deleting video data the last received request for which is the oldest one.

21. The method of claim 14, wherein the mentioned video data segments additionally contain audio data and/or text data.

* * * * *